Aug. 26, 1969  G. MORDCHELLES-REGNIER ET AL  3,462,905
THERMAL INSULATION FOR WALLS
Filed Dec. 28, 1967  2 Sheets-Sheet 1
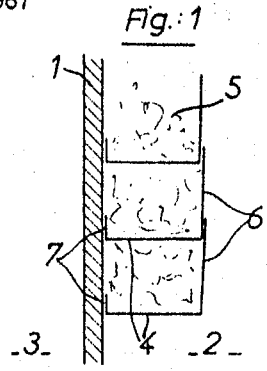
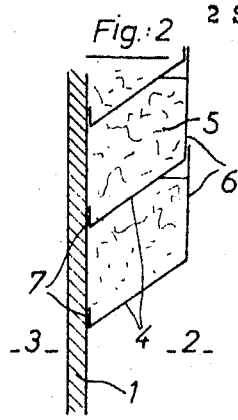
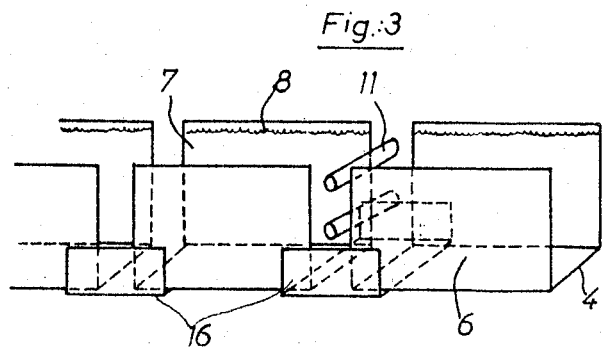
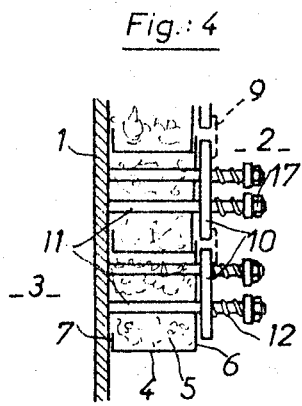
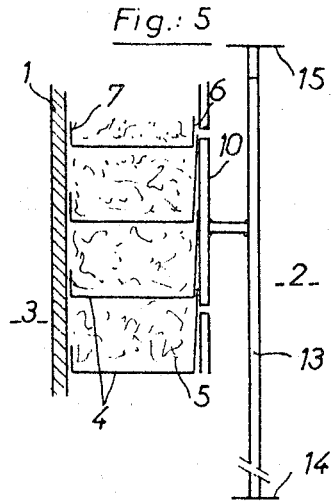

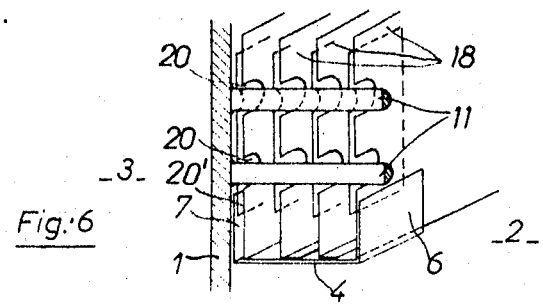
Fig. 6
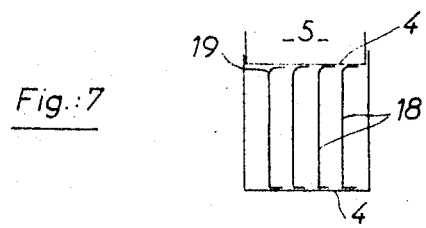
Fig. 7
Fig. 8
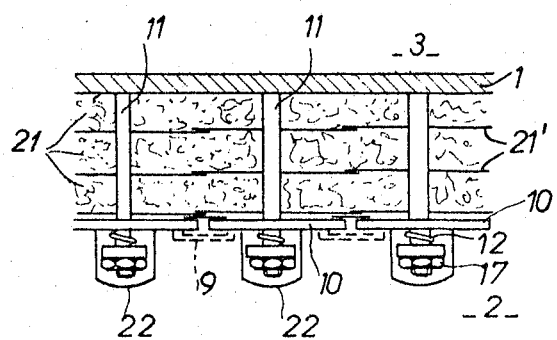

United States Patent Office 3,462,905
Patented Aug. 26, 1969

3,462,905
THERMAL INSULATION FOR WALLS
Georges Mordchelles-Regnier, Villiers-St.-Frederic, near Neauphle-le-Chateau, Paul Marcel Naudin, La Celle-Saint-Cloud, and Pierre Gabriel Micheau, Rambouillet, France, assignors to Bertin & Cie, Paris, France
Filed Dec. 28, 1967, Ser. No. 694,332
Claims priority, application France, Dec. 30, 1966, 89,641
Int. Cl. E04b 1/78
U.S. Cl. 52—404                7 Claims

ABSTRACT OF THE DISCLOSURE

A heat insulating system, chiefly for the walls or covers of the chamber of a nuclear reactor, comprising inside the chamber a number of superposed shelves adjacent the wall to be protected against the heat prevailing in the chamber, said shelves extending in a substantially horizontal direction and sloping advantageously downwardly towards the wall. Said shelves provided preferably with vertical flanges along the wall and along their edges spaced with reference to the wall form troughs filled with a pulverulent or fibrous material such as siliceous sand, balls or fibres.

---

The invention has for its object a thermal insulating system for the wall of any chamber, generally speaking, while it is applicable in a more particularly interesting manner, without this being exclusive, for the insulation of the chambers of nuclear reactors made of pre-stressed concrete.

It is a well-known fact that the part played by a thermal insulation consists in limiting the density of the flow of heat transmitted through it.

When the thermal insulation showing a porous structure is located inside a mass of fluid, heat is transmitted through the insulation by conduction within its solid structure on the one hand and by radiation and conduction or natural convection within the fluid filling the interstices of said structure. Natural convection becomes the predominant phenomenon in the transmission of heat in the case of heavy fluids of a low viscosity. It is then necessary to select an insulating structure limiting to a maximum the heat conveying movements.

On the other hand, in the particular case of a chamber containing a boiling liquid, as is the case for nuclear reactors of the boiling water type, an interface appears between the liquid and vapour phases at a predetermined level. Above said interface, the insulation system is in contact with the vapours which have a tendency to condense over the wall of the insulating material. The inside of the heat-insulating structure is thus filled to a major extent by the liquid phase flowing downwardly under the action of the hydrostatic pressure whereby the transfer of heat to the cold wall is increased.

The invention provides a simple and cheap solution for the problem of the thermal insulation of the walls of a chamber and more particularly in the case of vertical or substantially vertical walls.

According to the invention, there is provided on the wall to be insulated and inside the chamber a shelf system, the superposed shelves of which extend in parallelism with a substantially horizontal direction, so as to carry a filling of pulverulent or fibrous insulating material such as sand, silica spherules or silica fibres.

The shelves are constituted by small plates or screens carrying the insulating material and secured to the wall, said screens being possibly horizontal, but preferably oblique so as to slope downwardly towards the corresponding wall. The shelves include advantageously along their edges facing away from the wall a bent extension forming an upwardly directed flange, whereby they are given the shape of superposed troughs carrying the insulating material.

The granulometric structure of the pulverulent material or the size of the fibres is selected so as to provide the minimum perviousness consistent with the modifications in pressure which may appear inside the chamber.

On the other hand, the screens, which may be made of metal, prevent any heat conveying movements applied to the whole heat-insulating system and they hold the flow of condensate within the heat insulating sections lying inside the vapour phase. This leads consequently to an anisotropic permeability which is lower in a vertical direction than in a horizontal direction.

In the accompanying drawings given by way of example

FIGS. 1 and 2 are partial diagrammatic vertical cross-sectional views illustrating the principle of our improved insulating system.

FIG. 3 is a perspective view showing certain details of execution.

FIG. 4 is a vertical cross-section showing further details.

FIG. 5 is a cross-section similar to FIG. 4, showing a modification.

FIGS. 6 and 7 are further views illustrating other details.

FIG. 8 illustrates the application of our invention to the bottom of a chamber.

Turning to FIGS. 1 and 2, 1 designates the possibly multiple wall to be insulated, the hot fluid lying inside the chamber 2 and the cold circumambient medium lying outside as shown at 3. The wall 1 carries a plurality of screens 4 which are superposed with a predetermined vertical spacing in a horizontal direction. The actual screens may lie in a horizontal plane, as in the case of FIG. 1, but it is preferable to arrange them with a transverse slope, as shown in FIG. 2.

The screens carry a mass of sand 5 or of the like pulverulent or fibrous material held in position by means of a vertical flange 6 forming an upwardly folded extension of the screen 4, at a distance from the wall 1. The different vertical flanges 6 overlap slightly and the system thus formed appears as a system of shelves constituted by superposed troughs filled with an insulating material.

The advantage of the oblique screens illustrated in FIG. 2 consists in that they ensure, in the case of a defective filling or of a settling of the material, the cutting out of empty spaces which might form in the upper parts of the troughs and extend up to the wall 1.

The screens 4 may include another vertical flange 7 along the edge adjacent the wall 1, said flange being urged against the latter by the hydrostatic pressure of the filling material 5 and by its natural elasticity, in the case of a fibrous heat insulating. The flange 7 may be fluid tightly secured to the wall, for instance by welding, as illustrated at 8 in FIG. 3 and it may include an elastic section adapted to follow the settling of the filling material. In the absence of such an elastic section, the settling would lead to a slight obliquity of the horizontal screens.

In order to prevent the fibrous or granular filling material from entering the heat insulated chamber 2, filtering means should be provided in front of the ports through which the insulating compartment communicates with the inner volume of the chamber. Said means constituted preferably by metal gauze sheets may include two or more independent filters 9 inserted in series (FIG. 4), so as to make up for the possible deficiency of one of the filtering elements.

In order to resist the hydrostatic or elastic pressure of the insulating filling material, a metal shield 10 is located on the hot side, said shield being constituted by a number of small plates which allow expansion. Said plates may be secured to the cold wall 1 through the agency of pins 11 extending through the filling material 5. It is necessary in such a case to resort to elastic means 12 adapted to provide a compensation for the expansion of the pins with a view to cutting out a settling of the filling material during the successive heating and cooling cycles.

The plates forming the shield may, according to a modification, be secured to vertical uprights 13 anchored in the lower cover 14 and in the upper cover 15 of the chamber (FIG. 5).

Interesting results have been obtained by resorting to a filling material 5 constituted by a chemically pure siliceous sand, the granulometric size of which is higher than $50\mu$. The screens 4 forming with their vertical front and rear flanges 6 and 7 U-shaped members in the shape of troughs are advantageously made of stainless steel. In order to allow a free expansion, the trough may be made of elements of a length of about 1 m., fitted to a slight extent inside one another at their ends or else, according to a structural feature illustrated in FIG. 3, they may be separated by transverse gaps with the interposition of short auxiliary troughs 16 ensuring longitudinal continuity for the alined large main troughs, said auxiliary troughs lying in vertical registry with the pins 11.

We will now describe a manner of assembling the arrangement which has just been described in the case of a cylindrical chamber. This assembly is performed in succession for the different rows. When the lowest row is considered as finished, the auxiliary troughs 16 for the next lowest row are first positioned underneath the pins 11 over the sand 5 carried by the troughs of the underlying row. The main troughs are then laid over the small troughs 16 in a manner such that the metal sheets forming the different troughs overlap over a breadth sufficient to form a hindrance preventing the flow of fluid through the horizontal screen thus executed.

The plates forming the shield 10 are then positioned over the pins 11, while elastic washers or springs 12 are fitted round said pins and finally nuts 17 are tightened over said pins, so as to provide the desired spacing between the shield 10 and the cold wall 1. The sand 5 is poured inside the continuous trough thus formed along the chamber periphery. It is then subjected to vibration and settling and the sand weight urges the compound trough bottom into the sand of the underlying row of troughs. A further tightening of the nuts 17 exerts the desired pressure on the sand through compression of the elastic means 12. The flange 7 of the trough adjacent the cold wall may be electrically welded at 8 to the wall to be protected, before the filling of the trough is brought to a finish.

The uppermost row of troughs just underneath the upper cover 15 requires special filling means in order to cut out the possibility of an empty space at the upper end of the shelf system.

Once the whole system of shelves has been thus erected, with the shield 10 held fast in position, the filtering means 9 are secured to rods provided for this purpose. Such a securing may be obtained by welding or by clamping over a fluidtight packing, the metal filtering element being held fast inside a frame.

Under certain conditions, natural convection may become sufficiently intense for it to lead to a subdivision of the filling material into a number of independent cells separated by vertical partitions 18 (FIGS. 6 and 7) opposing any horizontal transfer of fluid. The upper edge of each of said vertical partitions may include a yielding section 19 formed prior to assembly in the shape of a rim allowing the partition to follow the movement of the next higher trough due to the action of the weight of sand filling the latter.

The front and rear flanges 6 and 7 of the troughs and also the partitions 18 may be given a length larger than the horizontal spacing between the pins 11. They are then provided with notches 20 (FIG. 6) which allow positioning them in overlapping relationship. Over the pins 11, plates 20' are fitted before assembly of the arrangement with the same spacing as the partitions 18, which plates are adapted to cover the notches in the vertical walls of the troughs.

The essential feature of the invention which consists in inserting metal screens preventing the passage of the flux of heat through a mass of insulating material is applicable in a particularly interesting manner to vertical walls but is also advantageously applicable to horizontal walls such as the lower cover of a chamber.

In the case of such a lower cover, no difficulty is met since the hot fluid lies above the heat insulating system and a stratification of the heat-insulating material is obtained which prevents any heat-conveying movements. The heat insulation of the lower cover is constituted by one or more layers of heat-insulating material, separated by horizontal metal screens. The shields made of separate members carried by metal uprights serve chiefly as a protection and as a support for the filters.

As to the upper cover, it is of advantage to form it separately before assembly in a reversed condition and to position it after turning it upside down. The heat insulation will be thus formed during a preliminary operation in a manner similar to the formation of the lower cover by means of a succession of layers 21 (FIG. 8) of a heat-insulating material, said layers being separated by horizontal screens 21'. The pins 11 and shield plates 10 are designed in a manner such as to carry with a reduced deformation the weight of the heat-insulating means.

The elastic means 12 inserted between the nuts 17 and shield plates 10 should be designed so as to exert a stress overcoming the weight of the whole arrangement, while it cuts out the formation of an empty space in the upper portion of the heat-insulating system. If such an empty space were however to be formed, its action on the operation of the arrangement would be limited, provided it does not communicate directly with the hot surface, since in such a case said empty space of a low thermal resistance would be inserted in series with the heat-insulating material showing a large thermal resistance.

In the latter embodiment and in all the precedingly disclosed examples, it is of interest to insert protecting cups 22 over the nuts 17 and springs 12, so as to prevent the passage of any heat-insulating particles through the clearances between the shield plates 10 and pins 11.

What we claim is:

1. A thermally insulated wall system for an enclosure containing a fluid in both liquid and vapor states, comprising a basic wall bounding said enclosure; a plurality of trough-like shelves spaced above each other and extending inwardly from the inner surface of said wall and raised edge flanges spaced from and opposite to said inner surface, said bottom portions being in superimposed relation with each other and thereby forming together a multi-barrier arrangement against vertical flow of said fluid along said inner surface, whereas said raised flanges are in mutual overlapping relation and thereby form together a fragmented partition pervious to said fluid; a filling of divided heat insulating material within each of said trough-like shelves; and a plurality of separate and distinct backing plates engaging said raised flanges interiorly of said enclosure to maintain the same against the thrust exerted thereon by said filling, and means engaging said plates interiorly of said enclosure to maintain said plates in contacting relationship with said raised flanges.

2. A system according to claim 1, further comprising fixing means extending from the wall through the shelves and the plates, whereby said plates are secured to the wall.

3. A system according to claim 2, wherein the fixing means comprise elastic means, whereby expansion of the heat insulating system and settling of the insulating material are compensated.

4. A system according to claim 1, further comprising filter means extending over the gaps separating the independent plates, whereby free passage is allowed therethrough between the insulating system and the inner volume of the enclosure, for the liquid and its vapour but not for the insulating material.

5. A system according to claim 1, wherein the bottom of a shelf rests on the insulating material enclosed in the underlying shelf adjacent its underside face.

6. A system according to claim 1, further comprising support means extending within the inner volume of the enclosure and means for securing the metal plates to said support means.

7. A system according to claim 1, further comprising longitudinal partitions extending substantially vertically and subdividing each of the trough-like shelves into elementary troughs.

References Cited

UNITED STATES PATENTS

| | | | |
|---|---|---|---|
| 1,226,334 | 5/1917 | Hunker | 52—495 |
| 1,610,181 | 12/1926 | Thomson | 52—404 |
| 1,993,500 | 4/1935 | Benner | 52—404 |
| 2,451,145 | 10/1948 | Baker | 52—249 |
| 2,513,448 | 7/1950 | Brunncell | 52—249 |
| 2,662,043 | 12/1953 | Clements | 52—404 |
| 2,982,623 | 5/1961 | Johnson | 52—249 |
| 3,361,284 | 1/1968 | Sotiri | 52—249 |

FOREIGN PATENTS

| | | |
|---|---|---|
| 1,295,092 | 7/1960 | France. |
| 52,262 | 9/1936 | Denmark. |

HENRY C. SUTHERLAND, Primary Examiner

U.S. Cl. X.R.

52—249, 459, 509

UNITED STATES PATENT OFFICE
CERTIFICATE OF CORRECTION

Patent No. 3,462,905                                        August 26, 1969

Georges Mordchelles-Regnier et al.

It is certified that error appears in the above identified patent and that said Letters Patent are hereby corrected as shown below:

Column 3, lines 61 and 62, after "extending" insert -- substantially horizontally, said trough-like shelves having respective bottom portions extending --.

Signed and sealed this 3rd day of November 1970.

(SEAL)
Attest:

Edward M. Fletcher, Jr.                         WILLIAM E. SCHUYLER, JR.
Attesting Officer                                       Commissioner of Patents